(No Model.) 2 Sheets—Sheet 1.

W. H. MARTIN.
LIFE SAVING DEVICE FOR RAILWAY PURPOSES.

No. 555,177. Patented Feb. 25, 1896.

Witnesses. Inventor.

William H. Martin.

(No Model.) 2 Sheets—Sheet 2.
W. H. MARTIN.
LIFE SAVING DEVICE FOR RAILWAY PURPOSES.
No. 555,177. Patented Feb. 25, 1896.
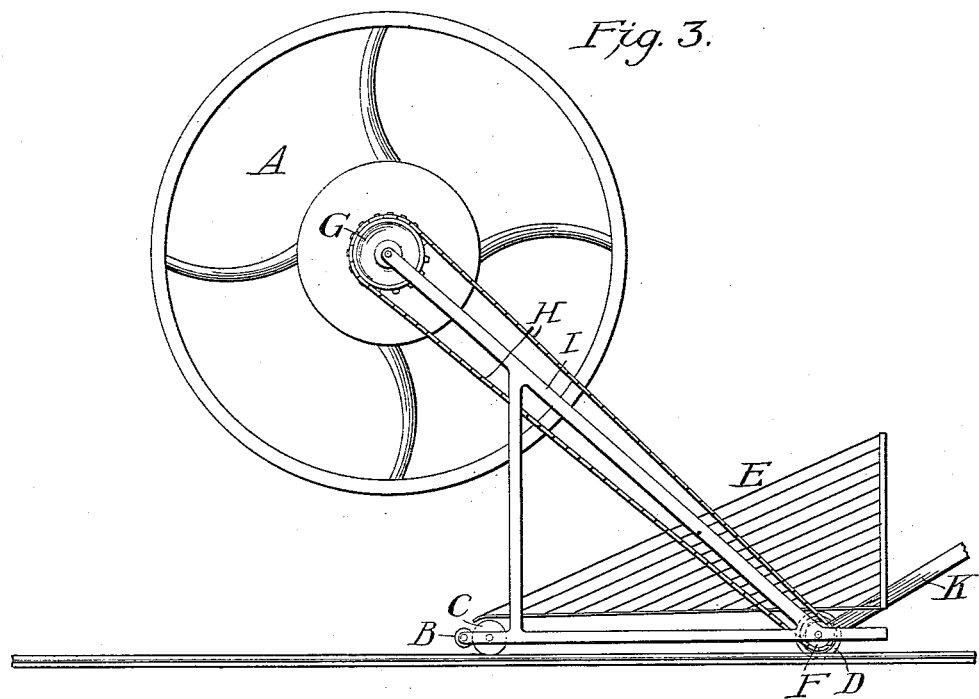
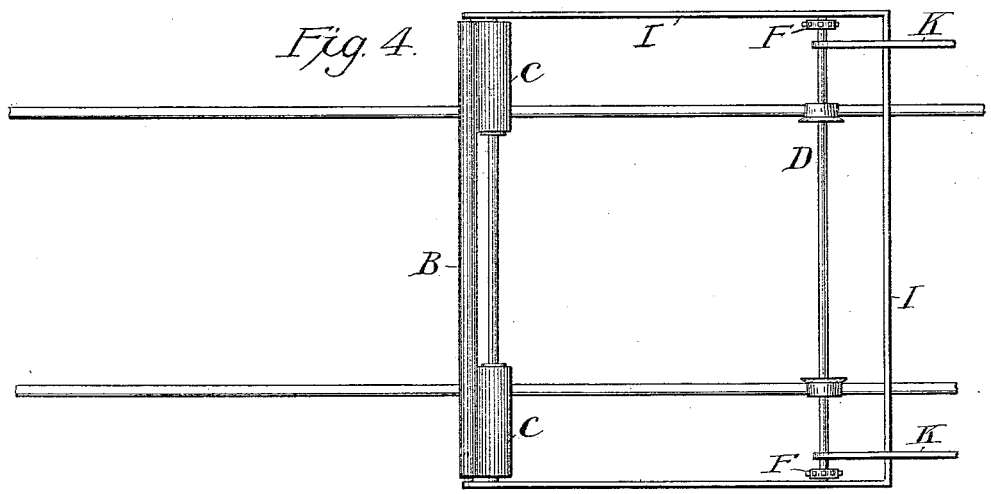
Witnesses.
Inventor.
William H. Martin.

United States Patent Office.

WILLIAM H. MARTIN, OF NATIONAL MILITARY HOME, ASSIGNOR OF ONE-HALF TO JASPER N. ARMSTRONG, OF LOS ANGELES COUNTY, CALIFORNIA.

LIFE-SAVING DEVICE FOR RAILWAY PURPOSES.

SPECIFICATION forming part of Letters Patent No. 555,177, dated February 25, 1896.

Application filed July 8, 1895. Serial No. 555,352. (No model.)

*To all whom it may concern:*

Be it known that I, WILLIAM H. MARTIN, a citizen of the United States, residing at the National Military Home, Los Angeles county, State of California, have invented a new and useful Life-Saving Device, of which the following is a specification.

My invention relates to railway-car fenders, for which purpose I have invented a reel and friction-roller device heretofore unknown to me.

The object of my invention is to save the lives of people who may be on the track in front of the car when the car is in motion, and to rescue them with as little harm or injury as possible. I attain these objects by the mechanism illustrated in the accompanying drawings.

Similar letters refer to similar parts throughout the different views.

Figure 1:
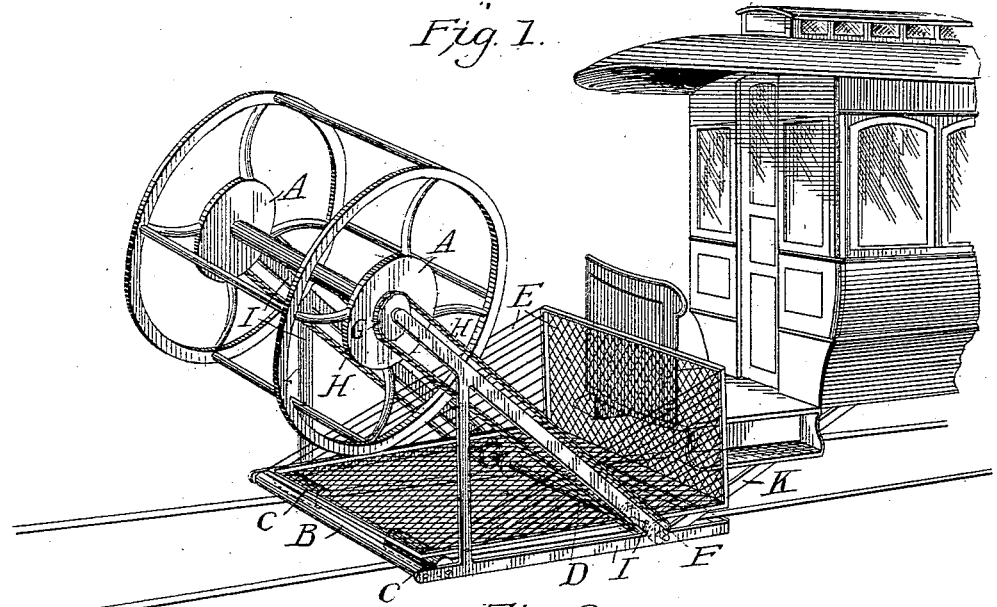
Figure 2:
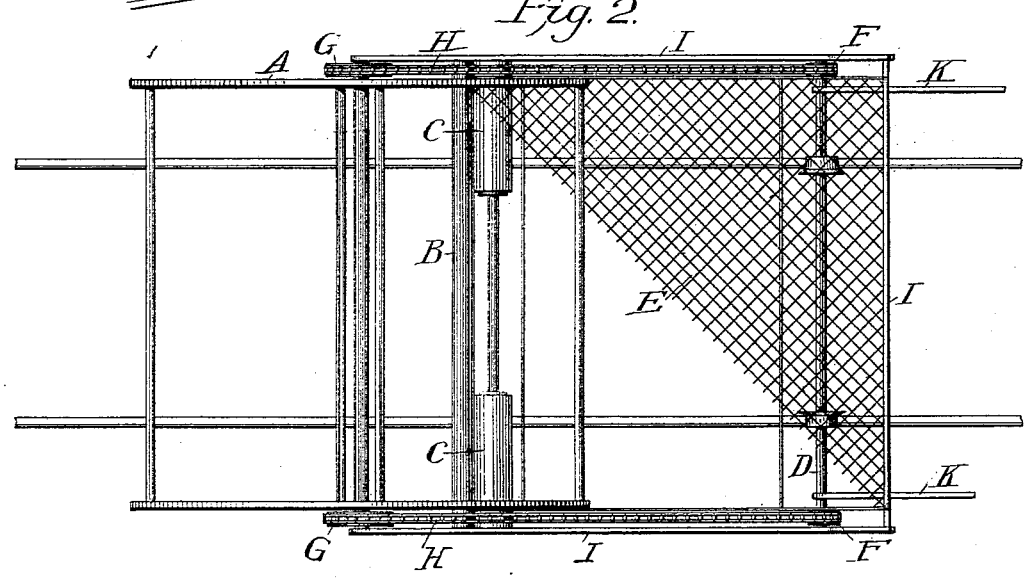

Figure 1 is a perspective view showing the device attached to the forward end of a motor-car. Fig. 2 is a top view after the removal of half of the wire-netting cage diagonally from opposite corners, showing the rubber friction-rollers C C and B, and the chain belts H H passing around F and G at either side of the device. Fig. 3 is a top view after the removal of the reel A, the chain belts H H, the cage E, and upper portion of the frame I I, laying bare the truck D and friction-rollers C C and B and the lower portion of the frame I I. Fig. 4 is a side view showing the friction-roller B to clear the rail about one (1) inch, and C to turn on the rail.

The extreme ends of the axles of D and C C and end pins of B turn in the side pieces of the frame I I.

D represents the rear truck, the axle extending the entire breadth of the car. Secured to the axle are two (2) small flanged car-wheels to follow the rail. At either end of the axle are secured sprocket-wheels F F for the chain belts H H.

C C represent rubber rollers secured to an axle. They turn on the rails and carry the forward end portion of the device. They also turn B by means of friction, giving B a reverse motion. The coupling-straps K K lead from the axle of the rear truck D to a bar underneath the car, but not shown in any of the views.

The coupling-straps K K have an eye at either end, the bar working loose in the eye at the car end and the truck-axle turning in the eye at that end, the straps working as if hinged at either end, allowing the car to bob up or down without lifting the device from the track. I select Fig. 1 to describe the working of the device, as nearly all the parts are discernible in this view.

A represents the reel and receives its motion from D.

D represents the rear truck, consisting of an axle and two (2) small flanged car-wheels to follow the rails. At either end of that axle and next to the frame I I are secured sprocket-wheels F F, the axle turning with the car-wheels and sprocket-wheels. Secured to the shaft of reel A at either end are also sprocket-wheels G G in line with F F.

H H are chain belts passing around F and G at either side of the device. When the car is in motion F turns G, each side alike, and C C turns B, C C turning on the rails. B being smaller in diameter does not touch the rails and turns backward when the car is moving forward. The cage E is calculated to receive the victims and is secured to the upper portion of the frame I I.

The reel A is in motion whenever the car is moving and is intended to reach over and in front of the victims, pressing them backward in a falling position a little before the friction-roller B takes their feet from under them, A and B assisting each other in taking the victims and depositing them in the cage E. D turns F F, F F turns G G, G G turns A, and C C turns B.

What I claim as my invention, and desire to secure by Letters Patent of the United States, is—

The combination in a "life-saving device" of a reel A, supported by a frame I, I, run by chain belts H, H, passing around sprocket-wheels F and G, at either side of the device, having a cage E, secured to the frame I, I, resting on the axles of D, and C, C, with rubber friction-rollers C C, and B, substantially as described.

WILLIAM H. MARTIN.

In presence of—
F. I. GARDINER,
W. L. BAY.